United States Patent [19]
Baret et al.

[11] Patent Number: 5,341,671
[45] Date of Patent: Aug. 30, 1994

[54] HELIUM LEAK DETECTOR

[75] Inventors: Gilles Baret, Annecy; Roland Gevaud, Pringy, both of France

[73] Assignee: ALCATEL CIT, Paris, France

[21] Appl. No.: 949,155

[22] Filed: Sep. 23, 1992

[30] Foreign Application Priority Data

Sep. 24, 1991 [FR] France ............... 91 11755

[51] Int. Cl.$^5$ ............................................. G01M 3/20
[52] U.S. Cl. ................................................... 73/40.7
[58] Field of Search ...................................... 73/40.7

[56] References Cited

U.S. PATENT DOCUMENTS

| | | | |
|---|---|---|---|
| 4,294,106 | 10/1981 | Gevalid et al. | 73/40.7 |
| 4,779,449 | 10/1988 | Bley et al. | 73/40.7 |
| 4,893,497 | 1/1990 | Danielson | 73/40.7 |
| 4,919,599 | 4/1990 | Reich et al. | 73/40.7 |
| 5,107,697 | 4/1992 | Tallon et al. | 73/40.7 |
| 5,116,196 | 5/1992 | Baret et al. | 73/40.7 |
| 5,193,380 | 3/1993 | Tallon | 73/40.7 |

FOREIGN PATENT DOCUMENTS

| | | |
|---|---|---|
| 0070341 | 1/1983 | European Pat. Off. |
| 0268777 | 6/1988 | European Pat. Off. |
| 2452699 | 10/1980 | France |

*Primary Examiner*—Hezron E. Williams
*Assistant Examiner*—Michael Brock
*Attorney, Agent, or Firm*—Sughrue, Mion, Zinn, Macpeak & Seas

[57] ABSTRACT

A helium leak detector includes a gas analyzer and a secondary pump having at least on its discharge side a Holweck type stage. The pump is of a type enabling the suction pressure to be reduced to a value at least equal to $10^{-4}$ mbar and a discharge pressure which is sufficiently high to be compatible with the suction pressure of a dry primary pump having at least two stages. The secondary pump is connected to the low-pressure output of a sampling unit on an intermediate point of the secondary pump where the flow conditions are molecular. A sniffer probe is connected to the high-pressure side of the sampling unit. This high-pressure side is further connected to the dry primary pump between its at least two stages.

3 Claims, 2 Drawing Sheets

HELIUM LEAK DETECTOR

BACKGROUND OF THE INVENTION

1. Field of the Invention

The present invention concerns a helium leak detector comprising a gas analyzer and a secondary pump comprising at least on its discharge side a Holweck type stage, said pump being of a type enabling the suction pressure to be reduced to a value at least equal to $10^{-4}$ mbar and its discharge pressure being sufficiently high to be compatible with the suction limit pressure of a dry primary pump comprising at least two stages.

2. Description of the Prior Art

A detector of this type is particularly advantageous because it does not comprise any oil seal pump and may be used in applications where the vacuum must be very clean. Also, in "sniffer" mode operation where the pumped flow is low, low-flowrate dry pumps are sufficient and have the advantage of being lighter and less bulky than oil seal vane pumps. Also, these pumps can operate easily in any position.

U.S. Pat. No. 4,893,497 describes a helium leak detector of this type.

In this document, if the monitored container leaks helium enters the detector at the discharge side of a secondary pump where the pressure is approximately 40 mbar for small leaks. This does not provide excellent sensitivity for very small leaks. Also, there is a pipe fitted with a purge valve at the discharge of the secondary pump, and therefore also at 40 mbar, for depolluting the detector for inspection of a subsequent container in the event that a leak is detected during inspection of a previous container.

Effected at this pressure level, the purge does not depollute the detector quickly at the level of the secondary pump.

An object of the present invention is to propose a detector of the type previously defined applicable to sniffer mode operation providing very good sensitivity and most importantly enabling very good and fast recovery of the detector in the event of pollution thereof resulting from a monitored container leaking.

SUMMARY OF THE INVENTION

The invention consists of a helium leak detector comprising a gas analyzer, a secondary pump comprising at least on its discharge side a Holweck type stage, said pump being of a type enabling the suction pressure to be reduced to a value equal to $10^{-4}$ mbar or better and its discharge pressure being sufficiently high to be compatible with the suction pressure of a dry primary pump comprising at least two stages, wherein said secondary pump is connected to the low-pressure output of a sampling unit at a point on said secondary pump where the flow conditions are molecular, a sniffer probe being connected to the high-pressure side of said sampling unit, said high-pressure side is further connected to said primary pump between said at least two stages thereof.

One embodiment of the invention will now be described with reference to the appended drawings.

DETAILED DESCRIPTION OF THE INVENTION

Figure 1:
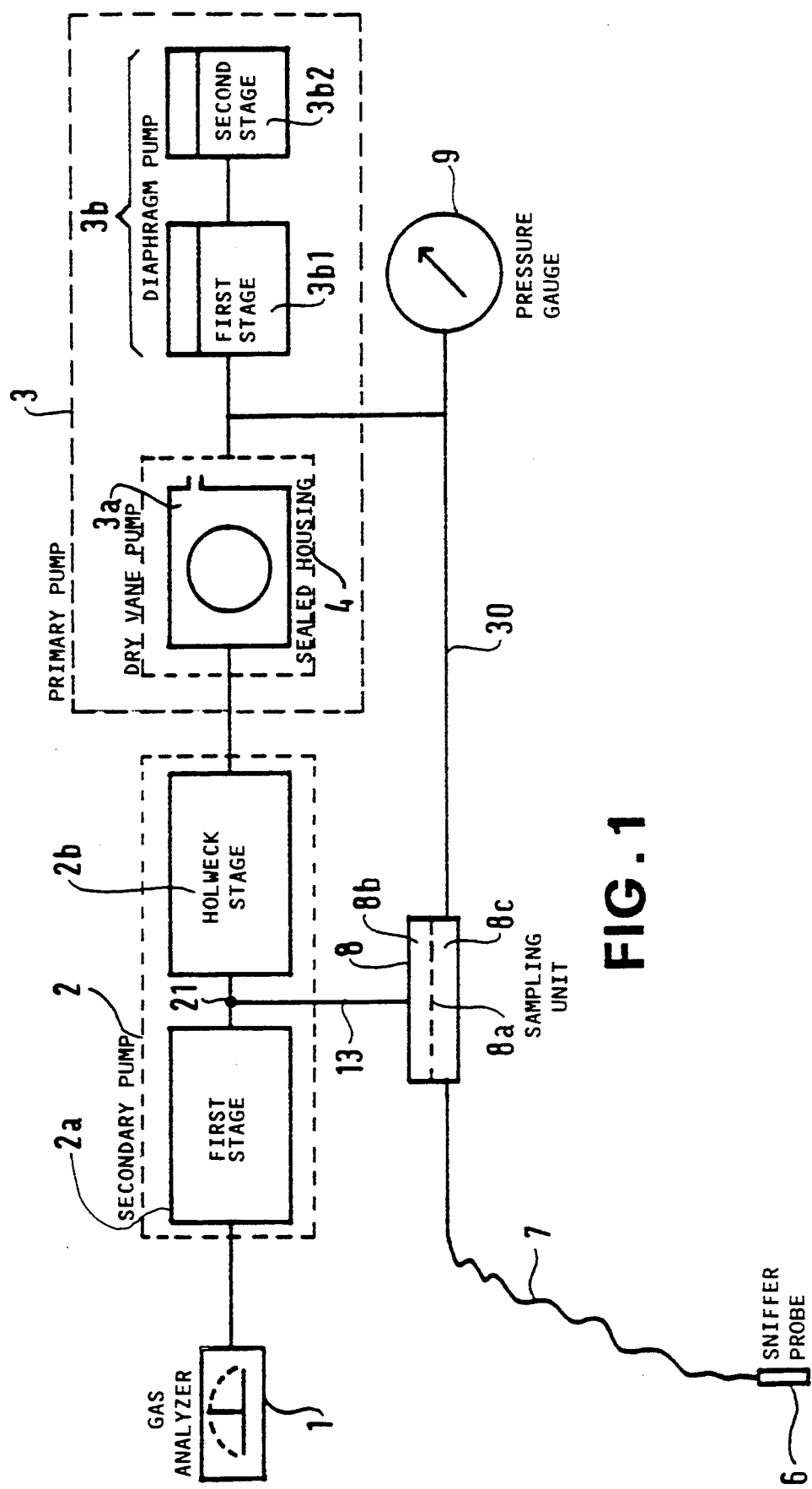
FIG. 1 is a block diagram showing a helium leak detector in accordance with the invention.

Referring to FIG. 1, a gas analyzer 1 is connected to a secondary pump 2 having two stages 2a, 2b of which at least the stage 2b at the discharge end is a Holweck type stage.

This secondary pump 2 can achieve on the suction side a vacuum of $10^{-4}$ mbar or better while having a discharge pressure compatible with the suction pressure of a dry primary pump 3. The primary pump 3 comprises at least two stages 3a and 3b.

In the example shown the stage 3a is a dry vane pump in a sealed housing 4. The stage 3b is a diaphragm pump comprising two stages 3b1 and 3b2 in series.

The suction side of the stage 3b is connected to the sealed housing 4 and the dry vane pump 3a discharges into the housing 4.

The discharge pressure of the secondary pump 2 is in the order of 10 mbar which is compatible with the suction pressure of the primary pump 3. This dry primary pump 3 could be another type of dry pump, for example as described in the prior art U.S. Pat. No. 4,893,497.

In accordance with the invention, the detector comprises a sampling unit 8 comprising a needle valve, for example, or (as shown) a porous membrane 8a, a low-pressure side 8b which is connected by a pipe 13 to an intermediate point 21 on the secondary pump 2, between stages 2a, 2b where molecular flow conditions apply ($10^{-2}$ mbar, for example).

A sniffer probe 6 is connected by a connecting tube 7 to the sampling unit 8 on the high-pressure side 8c of the porous membrane 8a. The pressure in this side 8c is the same as the suction pressure of the stage 3b of the primary pump 3 (around 50 mbar, for example).

Finally, the high-pressure side 8c of the sampling unit 8 is connected to the primary pump 3 between its two stages 3a and 3b via a pipe 30.

A pressure gauge 9 is connected to the pipe 30 connecting the sampling unit 8 to the primary pump 3. This pressure gauge 9 is used to monitor the state of the probe 6 and in particular to detect if it is blocked by observing any drop in pressure.

The sampling unit 8 is situated in the detector, and the pipe 13 is therefore very short. The connecting tube 7 of the probe 6 is removable and removing the tube 7 shuts off the sampling unit 8.

The flow aspirated by the probe 6 under viscous conditions is very rapidly conveyed to the sampling unit 8, ensuring a relatively short transfer time. Also, the connection of the sampling unit 8 to the point 21 of the secondary pump 2, that is to say relatively near the analyzer 1 where the flow conditions are already molecular, achieves very good sensitivity.

The installation can therefore be used to measure both very small leaks and large leaks.

Finally, by virtue of the point 21 to which the sampling unit 8 is connected, the installation has excellent recovery capacity following pollution of the apparatus by helium resulting from a previously inspected enclosure leaking, this recovery being automatic and continuous and not requiring any purge.

If the probe is no longer aspirating helium but air, this sweeps through the high-pressure part of the secondary pump 2 (upstream of the point 21) and of the primary pump 3, constituting a screen which prevents the helium that has accumulated on its downstream side flowing back towards the spectrometer 1.

Inspection of another container can therefore be carried out very quickly.

This is confirmed by experience. If the connecting tube 7 is removed after a leak (which automatically shuts off the sampling unit 8, as mentioned above), the helium signal at the spectrometer 1 increases because the helium that has accumulated downstream of the point 21 is no longer stopped by the air flow present before the probe 6 was removed. If there has not been any leaks during previous tests and therefore no accumulation of helium in the apparatus, removing the probe causes a slight decrease in the helium signal which, before the probe was removed, represented the amount of helium in the air. In this case removing the probe causes the apparatus to pump into a dead end and a helium signal is obtained below that representing the partial pressure of helium in the air.

It is thus seen that the apparatus in accordance with this invention provides excellent recovery after a test during which a leak has been detected.

Figure 2:
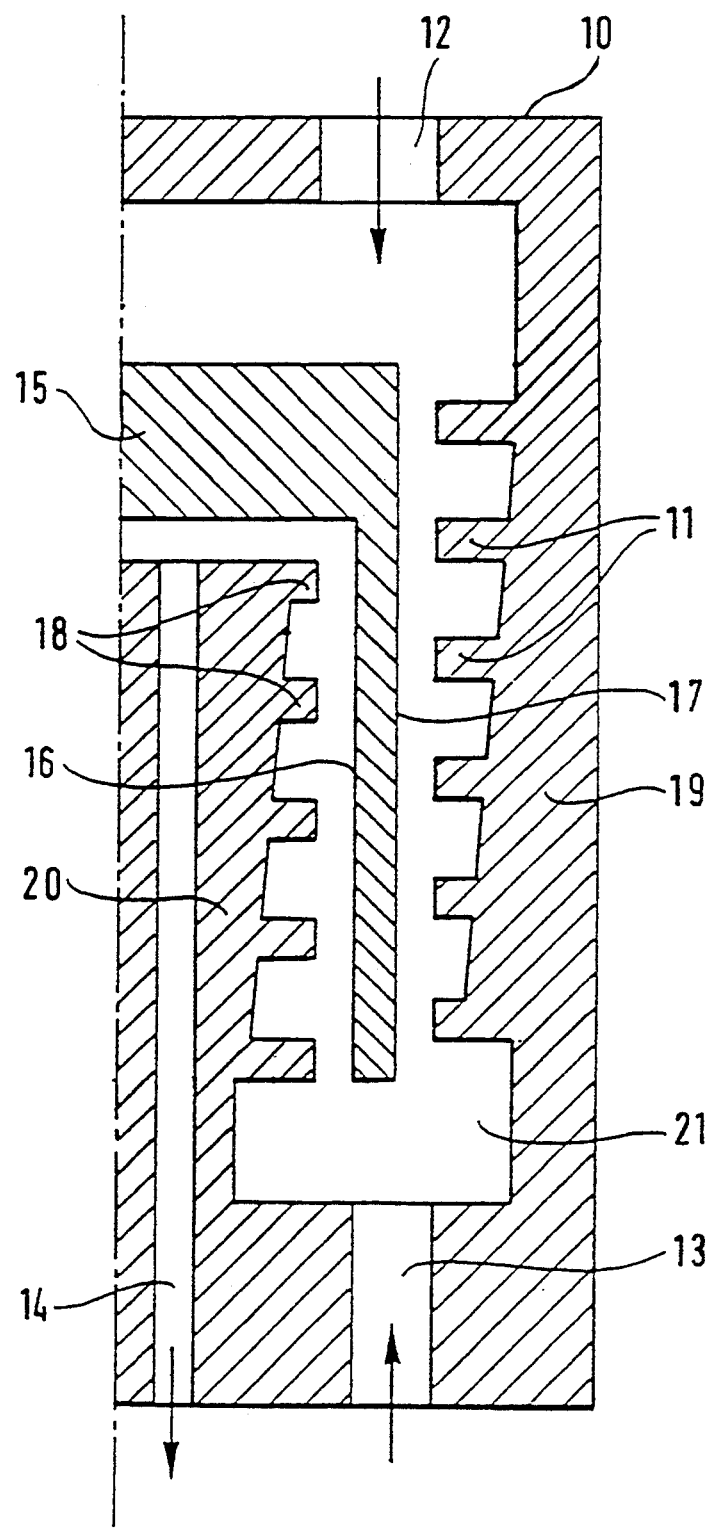
FIG. 2 is an axial half-section through a secondary pump which may be used in a detector in accordance with the invention.

FIG. 2 shows one embodiment of a Holweck type pump 2 with two concentric stages as preferably used in the present installation. In this implementation the pump has an outer casing 10 into which are machined helical grooves 11 whose depth decreases from a suction orifice 12 to a space 21 located between the two stages of the pump. The pipe 13 providing the connection to the sampling unit 8 from FIG. 1 discharges into this space 21.

The pump 2 comprises a rotor 15 rotating at high speed between two stators 19 and 20. The area between one side 17 of the rotor 15 and the stator 19 constitutes a low-pressure pumping stage and the area between the other side 16 of the rotor 15 and the stator 20 constitutes a high-pressure pumping stage. The stator 20 includes machined helical grooves 18 whose depth decreases from the space 21 to a discharge tube 14.

There is claimed:

1. Helium leak detector comprising; a gas analyzer, a dry primary pump, a secondary pump connected in series with said primary pump and comprising at least on a discharge side thereof, a Holweck type stage, said secondary pump comprising means for reducing the suction pressure to a value at least equal to $10^{-4}$ mbar and having a discharge pressure compatible with a suction pressure of said dry primary pump, said dry primary pump comprising at least two stages in series, said secondary pump being connected to a low-pressure output of a sampling unit at an intermediate point on said secondary pump where the flow conditions are molecular, a sniffer probe being connected to a high-pressure side of said sampling unit, and said high-pressure side being further connected to said dry primary pump at a point between said at least two stages thereof, whereby said helium leak detector has a very high level of sensitivity, as well as a very short period of recovery when helium pollution of the detector occurs during a previous inspection of a container having a leak.

2. Detector according to claim 1 wherein a first stage of said primary pump is a dry vane pump housed in a sealed housing, and said dry vane pump including an outlet opening into said housing, and a second stage of said primary pump having a suction inlet thereof connected directly to said housing.

3. Detector according to claim 1 wherein said intermediate point is at a pressure of approximately $10^{-2}$ mbars.

* * * * *